Nov. 13, 1928.
L. C. BLACK
1,691,623
WELL DRILLING TOOL
Filed June 17, 1925
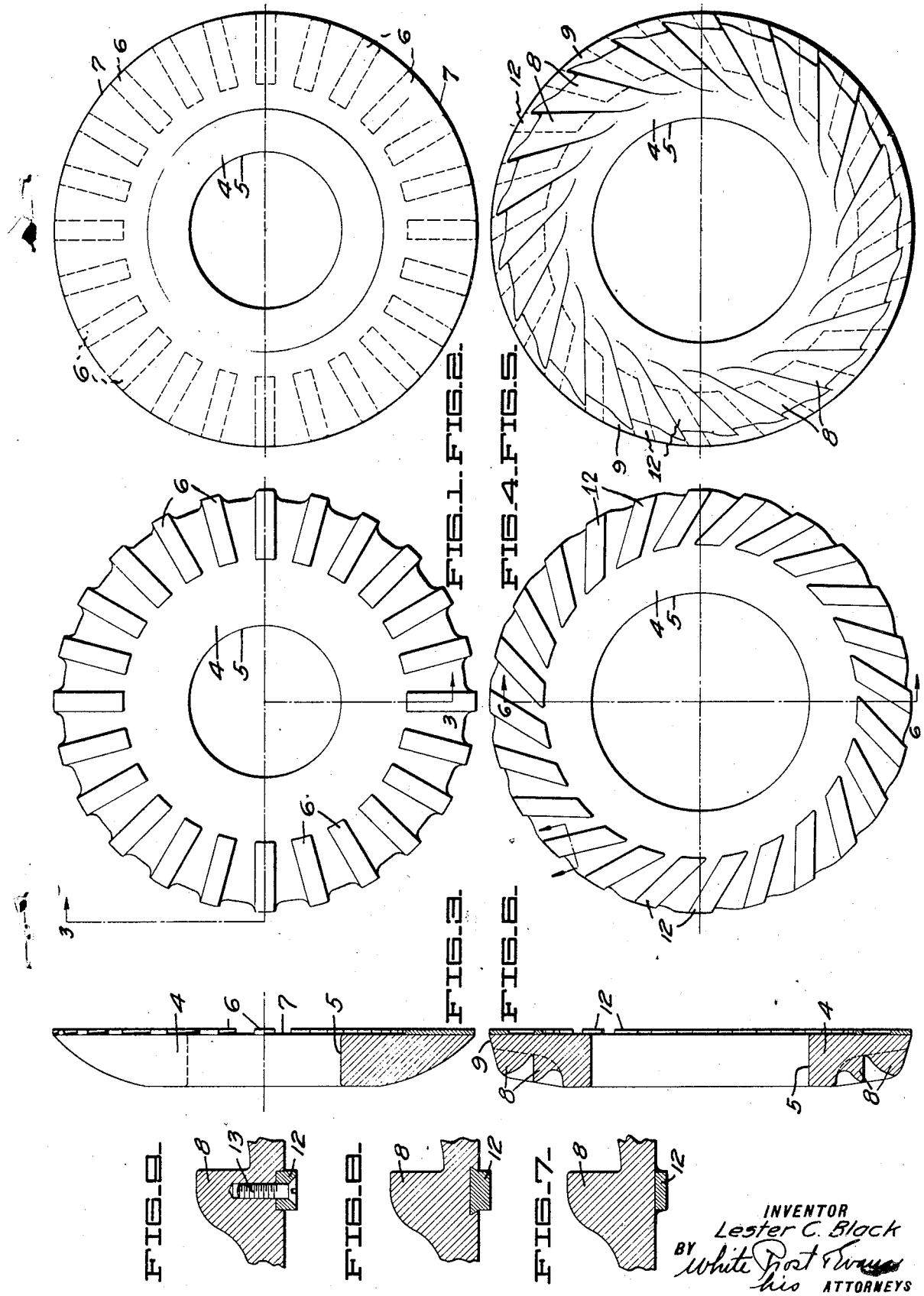
INVENTOR
Lester C. Black
BY
his ATTORNEYS Patented Nov. 13, 1928.

1,691,623

UNITED STATES PATENT OFFICE.

LESTER C. BLACK, OF LOS ANGELES, CALIFORNIA.

WELL-DRILLING TOOL.

Application filed June 17, 1925. Serial No. 37,657.

The invention relates to well drilling tools and particularly to rotary cutting discs which are employed in connection with rotary boring drills. A rotary boring drill of the general type to which rotary cutting discs are applicable is disclosed in United States Patent No. 1,224,287 issued May 1, 1917, this patent being referred to to disclose one form of rotary boring drill.

An object of the invention is to provide a rotary cutting disc having a toothed or fluted cutting edge which is maintained as the cutting edge wears away.

Another object of the invention is to provide a rotary cutting disc of such construction that a toothed or fluted cutting edge is formed by the abrasion of the cutting edge against the formation being cut.

The invention possesses other advantageous features, some of which with the foregoing will be set forth at length in the following description, where I shall outline in full several forms of cutting discs embodying my invention, which I have selected for illustration in the drawings accompanying and forming part of the present specification. In said drawings I have shown two forms of cutting discs embodying my invention but it is to be understood that I do not limit myself to such forms since the invention as set forth in the claims may be embodied in a plurality of other forms.

Referring to the drawing:

Fig. 1 is a front elevational view of the cutting disc embodying my invention, the disc being shown with a toothed cutting edge as is formed after the same has been in use.

Fig. 2 is a rear elevational view of the disc shown in Fig. 1, the periphery of the disc in this case being shown as smooth as corresponding to the form of the disc before the same has been in use.

Fig. 3 is a cross sectional detail taken along the line 3—3 of Fig. 1.

Fig. 4 is a front elevational view of another form of the disc of this invention, the periphery of the disc being shown as having a toothed cutting edge such as is formed by abrasion after the disc has been in use.

Fig. 5 is a rear elevational view of the disc shown in Fig. 4, the periphery of the disc being shown as smooth corresponding to its form before the disc has been in use.

Fig. 6 is a cross sectional view taken along the line 6—6 of Fig. 4.

Figures 7, 8 and 9, are detailed sections through the disc shown in Figure 4, showing different methods of applying the pads which form part of the present invention.

Rotary cutting discs have gone into extended use in oil well drilling operations. The discs are mounted for rotation about their axes on a stem or bit which is rotated about a vertical axis, so that the discs roll around in the hole being drilled, the cutting edges of the disc serving to shear off the material from the side of the hole. These discs are mounted on the rotary stem or bit in many different ways and at many different angles. In some constructions, the discs are vertical; in other constructions the discs incline toward each other at their lower end and in other constructions the discs incline toward each other at their upper end. Sometimes the discs are arranged on the outside of the stem and sometimes the stem is forked and the discs are arranged on the inside of the legs of the fork. The present invention relates to the cutting disc per se and not to its mounting on the drilling stem and the discs of my invention may be used in connection with any standard or suitable form of drilling stem.

I have found that the efficiency of the discs is increased if the cutting edge thereof is toothed or fluted and the discs so constructed that this cutting edge is maintained as the cutting edge is worn away by abrasion against the formation being cut. I have therefore provided a cutting disc, the cutting edge of which is maintained toothed or fluted by abrasion of the cutting edge against the formation. I obtain this result by forming the discs of circumferentially spaced portions of varying hardness, so that, as the disc is rotated against the formation, those portions of lesser hardness are worn away to a greater extent than the portions of greater hardness, so that a toothed or fluted peripheral edge or surface is produced, and this edge is maintained by the abrasion of the edge against the formation. I accomplish this result by arranging pads of harder metal than the metal of the disc, on one side of the disc adjacent the periphery thereof, the pads extending inward from the periphery of the disc and being spaced apart circumferentially, so that areas of lesser hardness exist between the pads. The discs are preferably formed of hard metal and the pads are formed of a harder metal alloy, such as "stellite."

In Figures 1, 2 and 3 I have shown the invention applied to a plain disc. The disc 4 is provided with a central aperture 5 to receive the stud or bolt on which the disc is journaled. Arranged on one side of the disc and preferably the front side, are a plurality of pads 6 of hard metal alloy, this alloy being harder than the material of which the disc is made. The pads 6 are spaced apart circumferentially and extend inward from the cutting edge 7 of the disc. In Figures 1 and 2 these pads are shown as extending inward radially. As the disc moves in contact with the formation, greater wear of the cutting surface is produced between the pads than at the pads, so that the cutting surface of the disc assumes the toothed or fluted form shown in the lower half of Figure 1, the teeth being formed by the pads 6 and the metal of the disc coincident therewith.

In Figures 4 and 5 I have shown the invention applied to a ribbed cutting disc such as is disclosed in my copending application Serial No. 744,565 filed October 20, 1924. This disc is provided on its rear face with a plurality of ribs 8 extending inward from the peripheral surface 9, the ribs in this instance being inclined to the radius. Due to the varying thickness of the discs which is caused by the presence of the ribs, the peripheral surface wears to different extents at different portions thereof, producing a toothed or fluted cutting edge. This effect is enhanced by arranging pads 12 of harder metal than the metal of the disc, on the other face of the disc, preferably the front face, the pads being coincident with the ribs, so that the wear of the cutting surface at the ribs is reduced, thereby causing the formation of more prominent teeth on the cutting edge, as the cutting edge is worn by abrasion against the formation.

The pads of harder metal may be secured to the front face of the disc in any suitable manner. The pads may be applied by arc welding, either by laying the metal on directly with the arc or by applying small bars or segments of the metal and spot-welding them to the disc. This method of attaching the pads is shown in Figure 7. In Figure 8 the face of the pad is provided with a slot into which the pad 12 is driven, the slot being dovetailed to insure secure attachment of the pad. In Figure 9 the pad is shown attached to the disc by means of a screw 13, the pad being partially countersunk into the disc to resist strain.

The size and spacing of the pads will depend upon the nature of the formation to be cut, since it appears that small pads closely set together will be more effective in cutting hard formation than large pads spaced apart a considerable distance. When desirable the disc may be originally formed with toothed or fluted cutting edges, such as is shown in the lower halves of Figures 1 and 4, but since these teeth are quickly formed by abrasion of the cutting edge against the formation, it is more expedient to form the cutting edges in a smooth curve or circle and permit them to become indented by abrasion against the formation.

I claim:

1. A self sharpening rotary disc cutter for rotary earth boring drills comprising a single metal disc and circumferentially spaced pads of harder metal than the metal of the disc arranged on one side of the disc at the cutting edge.

2. A self sharpening rotary disc cutter for rotary earth boring drills comprising a single metal disc and circumferentially spaced pads of harder metal than the metal of the disc arranged on one side of the disc and extending inwardly from the cutting edge of the disc.

3. A self sharpening rotary disc cutter for rotary earth boring drills comprising a single metal disc having a cutting edge and spaced pads of harder metal than the metal of the disc arranged on the front face of the disc and extending to the cutting edge, rolling of the disc over the formation causing greater wear of the cutting edge between the pads than at the pads, whereby a toothed cutting edge is formed.

4. A rotary cutter for boring drills comprising a metal disc having a cutting edge ribs on one face of the disc extending to the peripheral surface and pads of harder metal than the metal of the disc arranged on the other face of the disc and coincident with the ribs.

5. A self sharpening rotary cutter for rotary earth boring drills comprising a single steel disc having a cutting edge and circumferentially spaced members of harder metal alloy arranged on one side of the disc and extending to the cutting edge.

6. A rotary cutter for boring drills comprising a metal disc having a cutting edge circumferentially spaced ribs on the rear face of the disc extending to the cutting edge and pads of hard metal alloy on the front face of the disc and coincident with the ribs.

7. A rotary cutter for boring drills comprising a metal disc having a peripheral surface, ribs on the rear face of the disc extending to the peripheral surface and forming a peripheral surface having a toothed rear edge and pads of harder metal than the disc arranged on the front face of the disc coincident with the ribs.

8. A self sharpening cutter for rotary earth boring drills comprising a metal body member having a bearing surface, a plurality of spaced ribs on one face of the body member extending for a substantial distance away from the bearing surface, and spaced strips of harder metal than the body member arranged on the opposite face of the body member coincident with the ribs.

9. A rotary cutter for boring drills comprising a metal disc having a peripheral surface, ribs on one face of the disc extending to the peripheral surface, and members of harder metal than the disc secured to the disc and extending coincident with the ribs.

10. A self sharpening cutter for rotary earth boring drills comprising a single metal body member having an advancing face and a surface bearing upon the material being cut, a plurality of spaced pads of harder metal than the body member secured to the advancing face of the body member, the ends of said pads terminating coincident with said bearing surface and extending away from the same for a substantial distance.

11. A self sharpening rotary disc cutter for rotary earth boring drills comprising a metal disc having a peripheral contact surface, and pads of harder metal than the disc disposed upon one face of the disc in spaced relationship, the outer ends of said pads terminating coincident with said contact surface.

12. A self sharpening rotary disc cutter for rotary earth boring drills comprising a metal disc having a peripheral contact surface, and pads of harder metal than the disc disposed upon one face of the disc in spaced relationship, the outer ends of said pads terminating coincident with said contact surface, said pads having a weld connection to said disc.

In testimony whereof, I have hereunto set my hand.

LESTER C. BLACK.